(No Model.)
A. H. MERRILL.
ORNAMENTATION OF GLASS VESSELS.
No. 307,317.                    Patented Oct. 28, 1884.
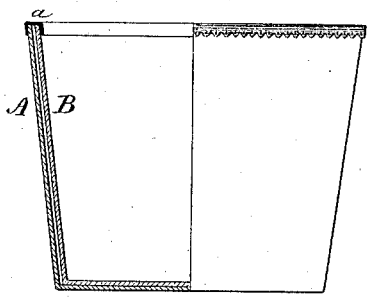
Witnesses.
J. N. Shumway
Jos. C. Earle
Arthur H. Merrill
Inventor
By atty.
John C. Earle.
N. PETERS. Photo-Lithographer, Washington, D. C.

UNITED STATES PATENT OFFICE.

ARTHUR H. MERRILL, OF CROMWELL, CONNECTICUT.

ORNAMENTATION OF GLASS VESSELS.

SPECIFICATION forming part of Letters Patent No. 307,317, dated October 28, 1884.

Application filed June 12, 1884. (No model.)

*To all whom it may concern:*

Be it known that I, ARTHUR H. MERRILL, of Cromwell, in the county of Middlesex and State of Connecticut, have invented new Improvements in the Ornamentation of Glass Vessels; and I do hereby declare the following, when taken in connection with accompanying drawing and the letters of reference marked thereon, to be a full, clear, and exact description of the same, and which said drawing constitutes part of this specification, and represents a sectional side view.

This invention relates to an improvement in the manufacture of glass vessels, such as vases, dishes, and other articles of table service, &c. Glass has long been employed for these articles, and has been decorated with colors by applying the colors to the surface and then "firing;" but such ornamentation is subject to wear in cleaning and otherwise, and soon wears away so as to present an imperfect appearance, it being impossible to so fire the colors as to make them positively permanent. Ornamentation has been applied to the inner surface, and then the inner surface gilded or otherwise coated. This gilding or coating for a time protects the ornamentation and forms a very desirable ground for it, but exposed to a little wear, as in use or cleaning, the inner coating wears away, and then presents an even less desirable appearance than without the coating.

The object of my invention is to construct ornamental articles of glass so that the ornamentation may be protected by a body of glass; and it consists in constructing the vessel of double thickness, the ornamentation applied to the inner surface of the outer vessel or outer surface of the inner vessel, the two set together and fixed as one article, whereby the ornamentation comes between the two thicknesses or walls of the vessel and exposed through the outer wall, as more fully herein inafter described.

In illustrating the invention I show a dish for table service which will be sufficient to enable those skilled in the art to apply my invention to other articles to which it may be adapted.

I first construct two vessels substantially separate and independent, so that one will fit within the other, leaving but a slight space between. A represents the outer vessel, and B the inner. Before setting the two parts together I apply ornamentation to the inner surface of the outer vessel, and if it be desired that the body of the glass shall be left in its natural condition I then set the inner vessel, B, of clear glass, within the outer vessel, and unite the two by a suitable band, *a*, around the top. This band may be of metal and highly ornamented. If it be desired to present a gilded surface upon the interior of the dish, before introducing the inner vessel I coat it upon the exterior with gilding, in the usual manner of gilding glass. This gilding will show through the outer vessel as a ground for the ornamentation, and will also give to the interior of the vessel a bright gilded appearance; or if a colored or opaque ground be desirable, then I accordingly coat the exterior of the inner vessel; or the coating may be applied to the interior of the outer vessel, if preferred, then the inner vessel introduced, and the two secured together. The coating will give color to the interior of the vessel and ground to the ornamentation on the outer vessel, the essential feature of my invention being a vessel composed of two walls, the coating or ornamentation applied between the two before they are attached, and then securing the two parts together.

I claim—

The herein-described improvement in the manufacture of glass vessels, consisting in a vessel composed of two independent parts of corresponding shape, set one within the other, the two united to form one complete vessel, the surface between the two vessels coated or ornamented before they are set together, substantially as described.

ARTHUR H. MERRILL.

Witnesses:
A. J. BRIGGS,
E. B. STEVENS.